US008170596B2

(12) United States Patent
Lindner et al.

(10) Patent No.: US 8,170,596 B2
(45) Date of Patent: May 1, 2012

(54) SECONDARY DATA TRANSMISSION IN A GROUP COMMUNICATION TRANSMISSION DATA STREAM

(75) Inventors: Mark Aaron Lindner, Superior, CO (US); Beth Ann Brewer, Canyon Lake, TX (US)

(73) Assignee: QUALCOMM Incorporated, San Diego, CA (US)

( * ) Notice: Subject to any disclaimer, the term of this patent is extended or adjusted under 35 U.S.C. 154(b) by 626 days.

(21) Appl. No.: 12/358,792

(22) Filed: Jan. 23, 2009

(65) Prior Publication Data

US 2010/0190518 A1   Jul. 29, 2010

(51) Int. Cl.
*H04B 7/00* (2006.01)
(52) U.S. Cl. ..... 455/518; 455/519; 455/450; 455/452.2; 455/453
(58) Field of Classification Search .......... 455/518, 455/519, 450, 453, 452.2, 424, 425, 463, 455/509, 451, 452.1, 455, 512–513; 370/469, 370/218, 542, 328, 338, 329, 352
See application file for complete search history.

(56) References Cited

U.S. PATENT DOCUMENTS

| 6,977,888 | B1 * | 12/2005 | Frenger et al. ............... 370/218 |
| 7,106,757 | B2 * | 9/2006 | Hong et al. .................. 370/469 |
| 7,346,018 | B2 * | 3/2008 | Holtzman et al. ............ 370/311 |
| 2002/0141491 | A1 * | 10/2002 | Corts et al. .................. 375/216 |
| 2006/0077996 | A1 | 4/2006 | Lee |
| 2006/0182152 | A1 * | 8/2006 | Bi et al. ...................... 370/542 |
| 2006/0199594 | A1 | 9/2006 | Gundu |
| 2006/0291452 | A1 | 12/2006 | Velagaleti et al. |
| 2007/0076660 | A1 | 4/2007 | Sung et al. |

FOREIGN PATENT DOCUMENTS

| EP | 1633091 | 3/2006 |
| EP | 1693994 | 8/2006 |
| WO | 2008157809 | 12/2008 |

OTHER PUBLICATIONS

International Search Report, PCT/US2010/021854, International Searching Authority, European Patent Office, May 6, 2010.
Written Opinion, PCT/US2010/021854, International Searching Authority, European Patent Office, May 6, 2010.

* cited by examiner

*Primary Examiner* — Pablo Tran
(74) *Attorney, Agent, or Firm* — Raphael Freiwirth

(57) ABSTRACT

A system, method, and wireless communication device that allow the transmission of secondary data in a group-communication data stream between wireless communication devices across a wireless communication network. The wireless communication device selectively transmits at least group-directed voice communication data to other members of a communication group, such as a push-to-talk (PTT) group, in a communication channel having a limited bandwidth thereof, and can selectively transmit secondary data in the same communication channel. A group-communication server preferably receives the voice communication data and secondary data and selectively transmits at least the voice communication data to other member wireless communication devices of the communication group. In one embodiment, the wireless communication device reduces the data size of the voice communication data to a second data size that is less than the bandwidth of the communication channel such that secondary data can be transmitted within the communication channel.

32 Claims, 5 Drawing Sheets

SECONDARY DATA TRANSMISSION IN A GROUP COMMUNICATION TRANSMISSION DATA STREAM

BACKGROUND OF THE INVENTION

1. Field of the Invention

The present invention relates to point-to-point or point-to-multipoint wireless communications systems. More specifically, the present invention relates to systems and methods for transmitting secondary data from within a communication channel established for group communications between wireless telecommunication devices.

2. Description of the Related Art

In wireless telecommunication devices, such as cellular phones, PDAs, mini-laptops, and advanced pagers, the devices typically communicate over long distances by bridging telephone calls through existing cellular telephone networks and passing data packets across the network. These wireless devices often have limited to significant data processing and computing capability, and can accordingly send and receive software programs, in addition to voice, across the telephone network. The communication channels established between the wireless telecommunication devices and the telecommunication portals, such as cellular base stations, have a limited bandwidth to allocate to any one particular device.

There exists a wireless telecommunication service that provides a quick one-to-one or one-to-many communication that is generically referred to as "Push-To-Talk" (PTT) capability. The specific PTT group of recipient devices for the communicating wireless device is commonly set up by the carrier. A PTT communication connection is typically initiated by a single button-push on the wireless device that activates a half-duplex link between the speaker and each member device of the group and once the button is released, the device can receive incoming PTT transmissions once the button is released. In some arrangements, the PTT speaker will have the "floor" where no other group member can speak while the speaker is speaking. Once the speaker releases the PTT button, any other individual member of the group can engage their PTT button and they will have the floor.

In existing PTT systems, member devices establish a communication channel for an outgoing voice communication and a channel for incoming communications. It is preferable to optimize the quality of voice transmission, and therefore, the full bandwidth of each channel is typically utilized to transmit the voice data packets to insure a high fidelity transmission. If other data is needed to be sent from and to a wireless communication device, typically either a separate channel is opened to the device solely for the additional data, which is expensive, or other existing channels allocated to the device, such as signaling and control channels, are utilized for the additional data. However, utilizing the other channels restricts the communication on those channels, which is often already predetermined by the system such as with control channels, and can impair the functionality of the device on the wireless network.

Accordingly, it would be advantageous to provide a system and method for a wireless communication device that is a member of a group to have the ability to send and/or receive non-voice data to and from other members of the group without necessarily opening an additional communication channel or utilizing and interfering with other channels established for other features and functions. The system and method should not compromise the integrity of other PTT communications or unduly utilize device resources. It is thus to the provision of such a system and method to allow this secondary data transmission that the present invention is primarily directed.

SUMMARY OF THE INVENTION

Briefly described, the present invention includes a system, method, and wireless communication device that allows the transmission of secondary data in a group-communication data stream between wireless communication devices across a wireless communication network. The wireless communication device selectively transmits at least group-directed voice communication data to other members of the group, such as a push-to-talk (PTT) group, and selectively sends secondary data in the same communication channel as the voice data, even though the communication channel has a limited bandwidth. A group-communication server can receive the voice communication data and secondary data, and will then selectively transmit at least the voice communication data to other member wireless communication devices of the communication group, and the secondary data can be sent to one or more members of the group. To facilitate secondary data transmission, the wireless communication device can be embodied so as to reduce the data size of the voice communication data to a second data size that is less than the bandwidth of the communication channel so that secondary data can be transmitted within the communication channel.

In one embodiment, the system for transmitting secondary data in a group-communication data stream between wireless communication devices includes at least one wireless communication device that is a member of a communication group of wireless communication devices that communicate with each other in direct group communications across a wireless communication network, with the wireless communication device configured to selectively transmit at least group-directed voice communication data to other members of the communication group in a communication channel having a limited bandwidth thereof, and secondary data to other computer devices, such as members of the group, across the wireless communication network with the transmission of the secondary data occurring in the communication channel in combination with the voice communication data. The system includes at least one group-communication server that is configured to receive voice communication data and secondary data from wireless communication device and selectively transmit at least the voice communication data to other member wireless communication devices of the communication group. If so embodied, the voice communication data will have a first data size thereof and the wireless communication device can be further configured to reduce the first data size of the voice communication data to a second data size that is less than the bandwidth of the communication channel and transmit secondary data within the communication channel in combination with the voice communication data of the second data size.

In one embodiment, the method of transmitting secondary data in a group-communication data stream between wireless communication devices includes transmitting at least voice communication data from at least one wireless communication device that is a member of a communication group of wireless communication devices that communicate with each other in direct group communications across a wireless communication network, with the at least one wireless communication device configured to selectively transmit at least group-directed voice communication data to other members of the communication group and secondary data to other computer devices across the wireless communication network, and the transmission of the voice communication data and secondary data occurring in a communication channel having a limited bandwidth thereof. If so embodied, the voice communication data has a first data size thereof, and the method includes reducing the first data size to a second data size that is less than the bandwidth of the communication channel, and transmitting secondary data within the communication channel in combination with the voice communication data of the second size.

In one embodiment, the wireless communication device, which is a member of a communication group of wireless communication devices that communicate with each other in direct group communications across a wireless communication network, is configured to selectively transmit at least group-directed voice communication data to other members of the communication group in a communication channel having a limited bandwidth thereof and secondary data to other computer devices across the wireless communication network. The transmission of the secondary data occurs in the same communication channel as the voice communication data. The voice communication data can have a first data size thereof and the wireless communication device can be further configured to reduce the first data size to a second data size that is less than the bandwidth of the communication channel and transmit secondary data within the communication channel with the voice communication data of the second data size.

The present system and method are therefore advantageous in that they give a wireless communication device the ability to transmit and receive non-voice data to and from other wireless communication device members of the group without needing to open additional communication channel or utilizing other channels. The voice communication data can even be reduced to allow greater secondary data throughput. The system and method thus allows the non-voice data to be communicated without unduly utilizing device resources or other dedicated communication channels.

Other objects, features, and advantages of the present invention will become apparent after review of the Brief Description of the Drawings, Detailed Description of the Invention, and the Claims.

DETAILED DESCRIPTION OF THE INVENTION

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. The term "communication channel" means the same data flow in a real or virtual data traffic channel or other established socket. Further, like numerals refer to like elements throughout the several views, and the articles "a" and "the" includes plural references, unless otherwise specified in the description.

Figure 1:
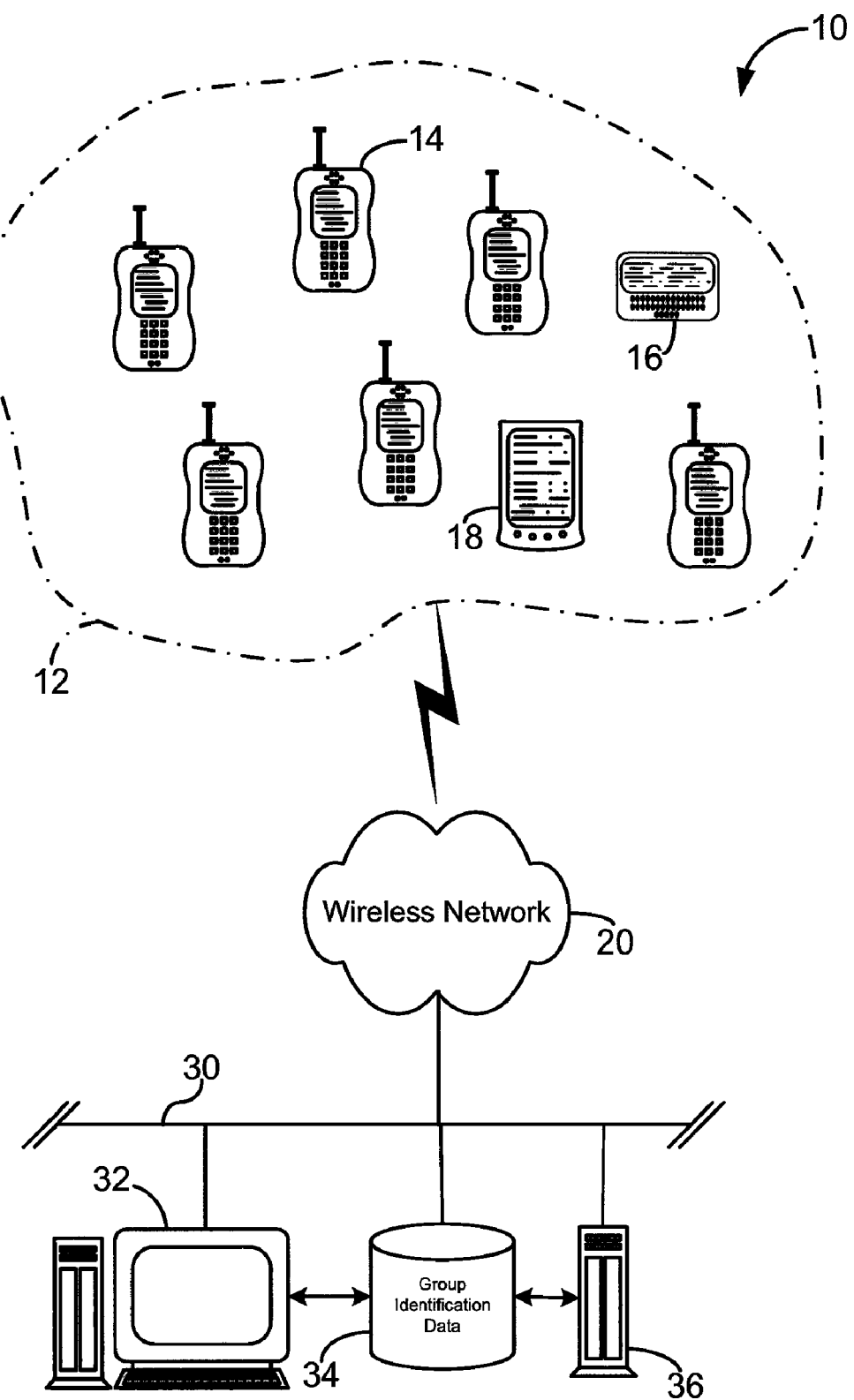
FIG. 1 is a representative diagram of a wireless network with a designated PTT group of wireless telecommunication devices communicating with a group communication server and other computer devices across the wireless network.

With reference to the figures in which like numerals represent like elements throughout, FIG. 1 illustrates one embodiment of the system 10 for sharing group media among one or more wireless telecommunication devices in a PTT group 12, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

Typically, the wireless telecommunication device (such as mobile telephone 14) notifies the group communication computer device, shown here as server 32, which is present on a server-side LAN 30 across the wireless network 20, that the wireless device is present, i.e. accessible, on the wireless network 20. The group communication computer device 32 can either keep the information on group member devices on the wireless network 20 or share this information with the set of target wireless telecommunication devices designated by the first wireless telecommunication device, or can also share it with other computer devices resident on the server-side LAN 30 or accessible across the wireless network 20. The group communication computer device 32 can have an attached or accessible database 34 to store the group identification data for the wireless devices. A data store 36, shown here as file management server, is also present on the server-side LAN 30. It should be appreciated that the number of computer components resident on server-side LAN 30, or across the wireless network 20, or Internet generally, are not limited.

The direct communication, such as a PTT voice communication, can be established through a half-duplex channel between the communicating wireless telecommunication device 14,16,18 and the one or more other wireless telecommunication devices of the target set. Also, the group communication computer device 32 can attempt to bridge the requested direct communication with the target set without knowledge of the wireless telecommunication devices of the target set actually receiving the PTT communication sent. Alternately, the group communication computer device 32 can inform the PTT transmitting wireless telecommunication device 14,16,18 of the inability to bridge a direct communication to the target set 12. Further, while the group communication computer device 32 is shown here as having the attached database 34 of group identification data, the group communication computer device 32 can have group identity data resident thereupon, and perform all storage functions described herein.

In overview, the system 10 can reuse an existing PTT data stream, such as an RTP voice stream, to carry custom application data packets to other computer devices, rather than set up a separate communication pathway. A PTT-enabled system already has established connectivity to the group members, so there is a great advantage to reusing the existing connectivity. The system 10 allows the transmission of secondary data in a group-communication data stream between wireless communication devices 14,16,18, where at least one wireless communication device, such as telephone 14, that is a member of a communication group 12 of wireless communication devices that communicate with each other in direct group communications across a wireless communication network 20, selectively transmits at least group-directed voice communication data to other members of the communication group 12 and secondary data to other computer devices, such as wireless pager 16 and PDA 18, across the wireless communication network 20. The transmission can occur in the communication channel, which has a limited bandwidth, so that additional communication channels are not required to send the secondary data.

In the system 10, it is desirous to maintain a specific "quality of serve" (QoS) for the voice data transmission between the wireless communication devices. If bandwidth is limited for the transmission of data, especially with a limited amount of communication channels available for data transmission, the sending of secondary data within the limited communication channels could interrupt the voice data and degrade the QoS. The system 10 will therefore allow the secondary data transmission in the limited communication channel(s) while still maintaining QoS in the voice communications.

A group-communication server 32 receives the voice communication data and secondary data from the at least one wireless communication device (telephone 14) in the same communication channel and selectively transmits at least the voice communication data to other member wireless communication devices of the communication group 12. As further described in FIG. 5, wireless communication device (telephone 14) is preferably further configured to reduce the first data size of the voice communication data (up to the equivalent of bandwidth data slot size A) to a second data size (size C) that is less than the bandwidth (A) of the communication channel, and then transmit secondary data (data block having size B in slot 122) within the communication channel in combination with the voice communication data (data block having size C in data slot 122) of the second data size. Alternately, the wireless communication device 14 can keep the voice communication data at the current size and simply insert secondary data when adequate bandwidth is available, with the inserted secondary data up to the maximum bandwidth A. In such embodiment, however, a guaranteed throughput of secondary data may not be possible as transmission in each data slot 122 is not assured if bandwidth is not available. Several communication channels that are in use can also be utilized in the present direction, in both the forward and reverse direction, such that each channel can implement the transmission or receipt of secondary data.

The system 10 can further include a data store 36 in communication with the group communication computer device (s) 32, with the group communication computer device 32 configured to send group-directed media to the data store 36, as is further described herein. The data store 36 is configured to receive the group-designated media from the wireless communication device (such as mobile phone 14) and selectively permit members of the communication group 12 for which the group-directed media was sent to access the stored group-directed media across the wireless communication network 20.

The secondary data can be group-directed media, such as graphic media, such as pictures in JPEG, TIF, and the like, audio files such as MP3, MP4, WAV, and the like. The media can also be streaming media, such as a multimedia application (Powerpoint, MOV file, and the like). The group-directed media can also be streaming media, or an interactive session on another computer device on the wireless communication network 20, such as a game hosted on data store 36 or private bulletin board. Also, the group-directed media could be half-duplex video conferencing among members of the communication group wherein the picture of the speaker is broadcast to the other group members in substantial real-time, or in delay.

The size of these media files can be very large, and because of the potential delay of sending the media, or inability of the receiving wireless communication device to handle the sent media, the system 10 can use a data store 36 (or file management server or other computer storage device or memory) to store the secondary data such that the secondary data can be selectively sent to the target members of the communication group 12 able to receive the secondary data, preferably without interrupting other PTT communications. Furthermore, upon receipt of the secondary data by at least one of the member wireless devices of the communication group 12, the group communication computer device 32 can send to the wireless communication device 14,16,18 sending the secondary data an acknowledgement that at least one member wireless communication device of the communication group 12 received the secondary data.

The wireless communication device 14,16,18 can target data to the group communication computer device 32 at the time of requesting the secondary data to be sent, e.g. send to a target list, and thus, the group communication device 32 will send or store the secondary data to the member wireless communication devices identified in the communication group identification data based upon one or more criteria as is further discussed herein. Alternately, prior to the wireless communication device sending secondary data, the wireless communication device 14,16,18 can request member data for a communication group 12 from the group communication computer device 32, and the group communication computer device 32 can identify one or more of the target devices that can and/or will receive the secondary data. In one embodiment, the communication group computer device 32 can filter the potential communication groups available based upon their member devices' capability to receive secondary data.

Figure 2:
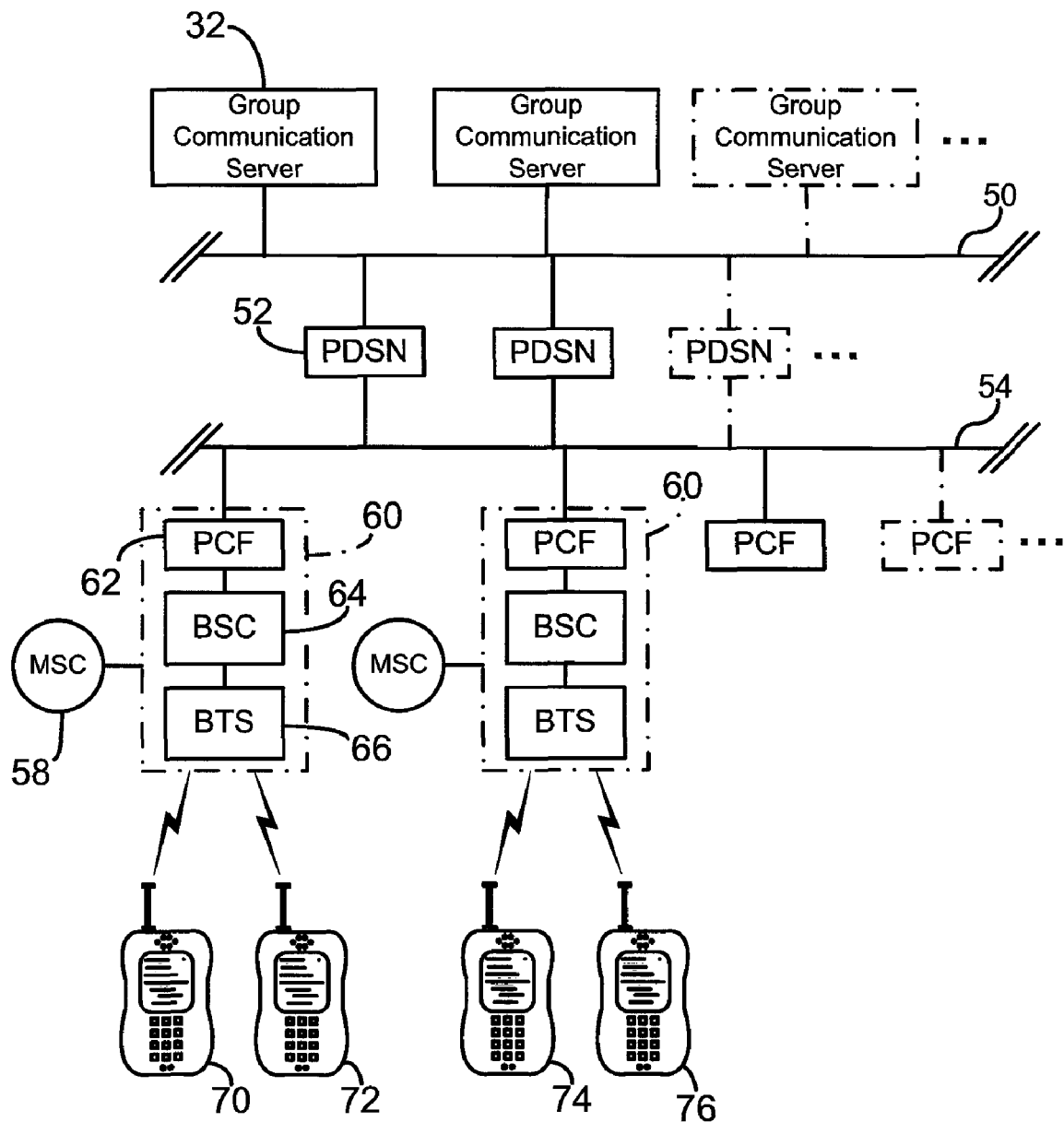
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of group communication computer devices (group communication servers) 32 that control communications between the wireless communication devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless communication devices 14,16,18 can request packet data sessions from the group communication server(s) 32 using a data service option.

The group communication server(s) 32 are connected to a wireless service provider's packet data service node (PDSN) such as PDSN 52, shown here resident on a carrier network 54. Each PSDN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 54 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Figure 3:
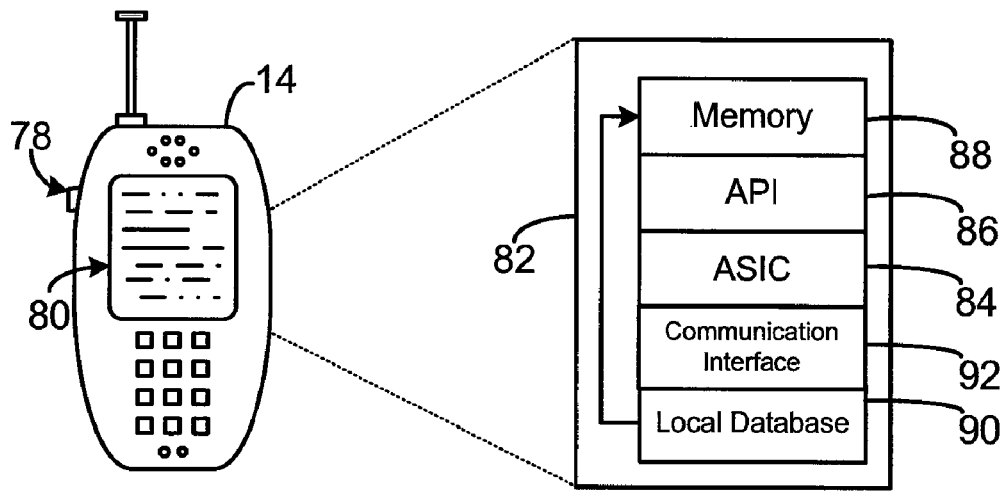
FIG. 3 is a block diagram illustrating the computer platform of the wireless telecommunication device with PTT capability.

FIG. 3 is a block diagram illustrating one embodiment of the wireless telecommunication device being a mobile telephone 14 with a PTT button 78 that opens the direct communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group-directed media. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information on the group-directed media, to include a file preview as is more fully described herein.

In this embodiment of the wireless device 14, the computer platform 82 also includes a communication interface 92 that can open one or more communication channels from the wireless device 14. The communication interface 92 is typically configured as a standard communication interface for the wireless communication device which ordinarily carries the voice and data transmitted to and from the wireless device. The communication interface 92 typically is comprised of hardware as is known in the art.

Figure 4:
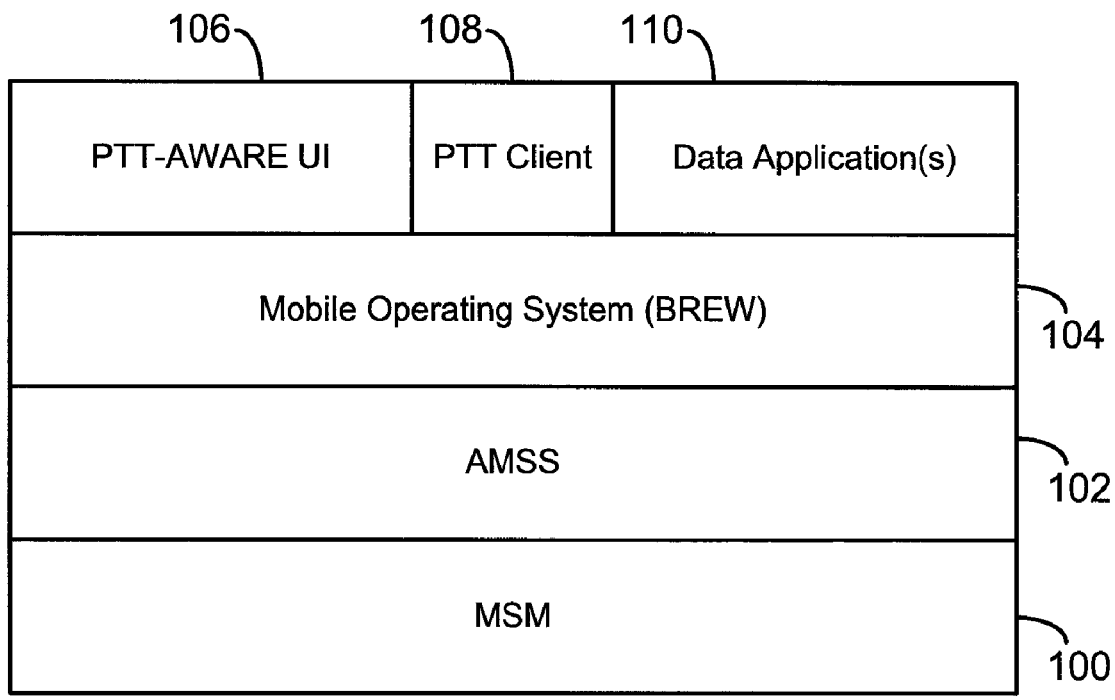
FIG. 4 is a diagram of one embodiment of the software layers of the communication group application, with a PTT client and a group-directed media client.

FIG. 4 is a diagram of one embodiment of the software layers of PTT facility and with PTT applications. In this embodiment, the computer platform 82 in the mobile device environment consists of a series of software "layers" developed on top of the Mobile Station Modem (MSM) 100 and the Advanced Mobile Subscriber Software (AMSS) 102, developed by QUALCOMM®, drives the underlying MSM chipset and implements the software protocol stack for the entire suite of CDMA communication technologies that include CDMA2000 1X and CDMA2000 1xEV-DO. There is a mobile operating system layer 104, which in this embodiment is BREW®, also developed by QUALCOMM®. The mobile operating system layer 104 application programming interfaces for chip- or device-specific operations, while providing an isolation layer that eliminates direct contact to the AMSS 102 and any OEM software on the computer platform. The mobile operating system layer 104 enables application development that uses mobile device features without having to rewrite the application each time a new release of the device-specific software is released.

The PTT Client 108 is an application that offers access to PTT services and applications 110 through an external interface, here shown at a PTT-aware UI 106. The PTT Client 108 includes all the functions required to enable mobile operating system 104 data applications 110. In addition to providing access to PTT services with the PTT Client 108, the PTT Client 108 preferably acts as an isolation layer between all PTT-aware applications and the interface to the group communication computer device 102. In this embodiment, the PTT Client 108 maintains access to PTT services, responds to group communication requests, processes all PTT-aware mobile operating system applications requests for PTT services, processes all outgoing PTT requests, collects and packages vocoder packets for originating PTT talk spurts, and parses packets of vocoder data for terminated PTT talk spurts.

The data applications 110 can communicate and pass secondary data through the PTT interface, and can be developed entirely as a mobile operating system-based application or used in combination with an AMSS 102 interface. The data applications 110 invoking the appropriate APIs and program interfaces, such as those from other resident PTT and applications 110.

In one embodiment, the system will have a new payload type for custom secondary data, which is filtered either at the group communication server 32, or at the receiving wireless communication device 14,16,18. A class ID (or generic application ID) will be embedded by the sending data application 110 in the RTP payload such that the receiving computer device can route the received packets to the appropriate data application 110. Thus, multiple data applications could be using the PTT interface and communication channel at any one time, but only one of them would be data application 110 that would "understand" the received custom data packet.

In order to increase the likelihood of data delivery, the custom data packets can be retransmitted, as necessary. However, such configuration may actually increase bandwidth usage. The same secondary data packet can simply be retransmitted according to preconfigured or signaled retransmission values. In one embodiment, the same packet can be transmitted multiple times and the receiving computer device could use the timestamp or a sequence number ("seqnum") to filter out duplicate packets. However, this method of retransmission can violate certain standard transmission protocols, such as RFC4588. Alternately, for increased likelihood of delivery, the application can use multiple PTT streams (but all in the same communication channel, i.e. various talk "spurt" data streams) to transmit the same packet. However, this embodiment will require using different SSRC values.

In another embodiment, the data applications 110 use a convention for a certain range of the SSRC values which are reserved for reuse. For example, the first 3 bits of the SSRC are reserved for identifying multiple streams. A receiving data application 110 then assumes that incoming streams with identical SSRCs from bit 4 to 32 are transmitting the same data, and filter out retransmitted packets on that basis. It should be noted that while Internet protocol dictates that SSRC should be random, this approach makes the SSRCs only mostly random. If the group communication server 32 signals multiple SSRC values to all receiving wireless communication devices (or computer devices), this would not violate the protocol.

It should be noted that group-communication server 32 can be configured to send both voice and secondary data, but those functions can be distributed among several servers or computer devices, typically across the LAN 50, with the secondary data not necessarily being associated with the voice communication data at the receiving computer device. Although, in PTT communications with the secondary data intended to supplement the voice data, it is preferably to associate the secondary with the voice data for ease of handling at the receiving computer device. In an embodiment where the communication group is limited to a primary wireless communication device of the member wireless communication devices 14,16,18 that can transmit group-directed voice communications to the group 12 at a specific time, i.e. an arbitrated floor, the wireless communication device 14 will be configured to transmit voice-communication data and secondary data upon the wireless communication device 14,16, 18 being the primary wireless communication device, i.e. has the floor. Alternately, the wireless communication device 14,16,18 can be further configured to transmit secondary data independently of having the floor, as is further described below.

Figure 5:
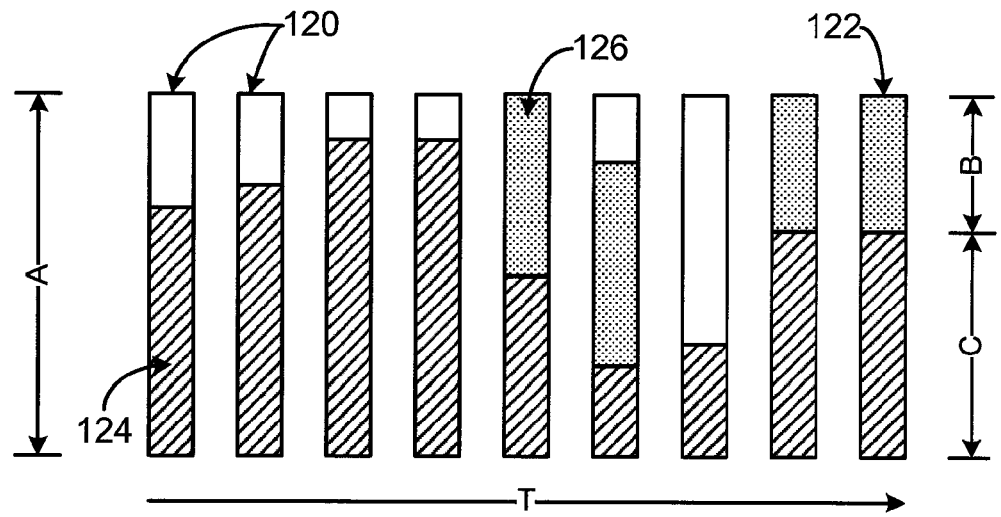
FIG. 5 is a representative diagram of a series of data slots being transmitted in a PTT communication along time axis T.

FIG. 5 is a representative diagram of a series of data slots 120 being transmitted in a PTT communication along time axis T. The data slots 120 have a bandwidth A into which are transmitted packets of data, which include voice data (block 124) and secondary data (block 126). Here, as shown in data slot 122, the voice data 124, having size C, and secondary data, having size B, fit within the full bandwidth A of the data slot 122. Through this manner, the secondary data 126 can be sent in the same communication channel as it fills up the full bandwidth A of the data slot of the channel. Moreover, in one embodiment, the transmitting device (wireless communication device 14,16,18 or group communication server 32 or other computer device) can purposely lower the data size of the voice data 124 such that a significant bandwidth can be made available to handle the secondary data 126. However, this will degrade the voice data and thus audio at the receiving wireless communication device 14,16,18, so it is preferable that the purposeful degradation of the audio signal not fall beneath a certain threshold. It should also be appreciated that multiple data streams of secondary data can be interleaved such that more than two data blocks can fill a data slot.

In one embodiment, the sending application will break up larger data voice packets into smaller blocks, thereby requiring the receiving computer device (group communication server 32 or wireless communication device 14,16,18) to reassemble the larger data packets and/or the data stream, similar in functionality to segment structuring in transmission control protocol (TCP). This functionality can also be implemented in user datagram protocol (UDP). If so embodied, the starting and ending seqnums are transmitted so the receiving computer device can determine all blocks of the packet are received and if any of the blocks are missing, the received packets can be discarded.

In one embodiment, as the group communication server 32 is designed to only forward secondary data from a transmitting wireless communication device 14,16,18 that has been granted the floor. On the transmitting device, the data application 110 can prepend, append, or embed a custom data packet in the middle of a voice data stream, possibly even increasing the overall bandwidth. The transmitting wireless communication device can monitor the bandwidth usage by tracking frame size(s) of the voice stream "throttle" when it sends custom data packets. If a stream of several frames are detected (number required would depend on data packet size, for example one standard is a 118-rate) the wireless communication device 14,16,18 can use the extra bandwidth available due to the smaller media packets to send a custom data packet with secondary data.

In one embodiment, the group communication server 32 informs the data application 110 applications (through OS 104 and then the PPT-Aware UI 106) what the group communication bandwidth capability is so applications can adjust the size and/or frequency of data packets being sent. This will allow richer features in the OS 106 and/or PTT layer as larger or more frequent data delivery is achieved when all data applications 110 have larger than normal bandwidth capabilities.

Additionally, the group communication server 32 can inform the wireless communication device 14,16,18 what the minimum voice data packet requirement is such that the wireless communication device 14,16,18 can reduce the voice data size to a second data size above that minimum, thereby causing the voice communication data to have voice data of a second, likely poorer quality. The wireless communication device 14,16,18 can thereby transmit secondary and voice communication data of a second size to comprise the full bandwidth (bandwidth A in FIG. 5) of the communication channel. Furthermore, several communication channels can be used with the same method applied to the full bandwidth of each available channel, and the secondary data can be split up across the several channels.

Figure 6:
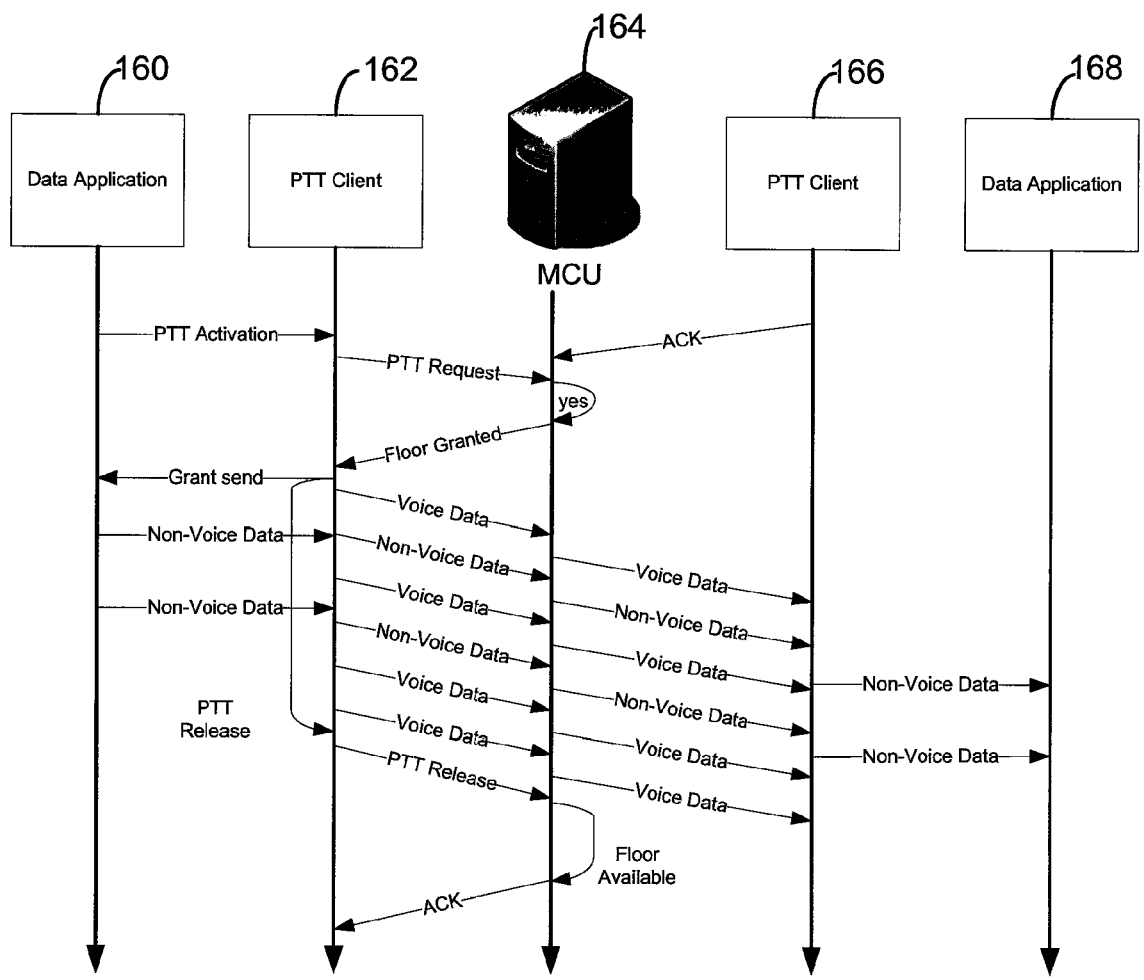
FIG. 6 is a call flow diagram of one embodiment of the non-voice data transmission occurring during a floor session as a PTT client on the transmitting wireless communication device transmits voice data packets.

FIG. 6 is a call flow diagram of one embodiment of the non-voice data transmission occurring during a floor session as a PTT client 162 on the transmitting wireless communication device transmits voice data packets along with non-voice (secondary) data. Resident on a communicating wireless device 14,16,18, a data application 110 requests that the PTT Client 162 establish a direct PTT call to share voice and non-voice data with the target device, shown here as having resident PTT Client 166 and data application 168. As shown, the same floor control mechanism can be used for both the voice data and non-voice data. The data application 110 desires to send non-voice data packets during subsequent talk bursts from the PTT usage, and thus, there is a single floor control mechanism used for both the voice call and the sharing of the non-voice data. The data application 110 requests that the PTT Client 162 establish a PTT direct call with the target user and include a group-directed media type to the PTT call. However, the data application 110 can alternately wait until a PTT call is originated for voice and then attempt to send the secondary data.

The call setup request can contain, for instance, the target user address, the non-voice data application ID, the media type, and an indication that the non-voice data is to be shared using the same floor control mechanism as the PTT call. The call setup request may also be sent with a DataOverSignaling Access channel message. A Dispatch Call Handler (DCH) (not shown) performs the PTT call setup functions, including locating the target, applying call restrictions, selecting a vocoder and assigning Media Control Unit (MCU) 164 resources.

The target PTT Client 166 verifies that the target user is available to participate in the call and that the data application 160 associated with the secondary data application ID is present on the target client wireless communication device 14,16,18. The target PTT Client 166 sends an acknowledgement to the indicating that the call has been accepted. Once the acknowledgement is received from the target PTT Client 166, a floor grant message is sent to the originating PTT Client 162, which indicates the call is being established and the PTT Client 162 can start collecting voice data and/or secondary data for transmission. The PTT Client 162 notifies the data application 160 that the call setup was successful and group-directed media can be sent. The PTT Client 162 also notifies the user that the user can begin speaking. The PTT Client 162 collects and buffers both the voice media (the user's talk spurt) and the non-voice data that is received from the data application 160. Once the MCU 164 contact information message is received and acknowledged by the originating PTT Client 162, the buffered media is sent to the MCU 164. The MCU 164 waits for the target PTT Client's 166 acknowledgment of the MCU 164 contact information message prior to forwarding the voice and non-voice data to the target device. When the target PTT Client 166 receives the media, it may filter the media based on the synchronization source (SSRC) and payload type to process the PTT media correctly. The payload of the custom data packet could contain a list of SSRC (or any identifier) to route data packets to. The MCU will then only forward these packets to the member devices identified as capable of receipt, which is either known to the MCU 164 or sent from the transmitting device. Thus, a sending data application 110 can transmit data packets to only a subset of the group members 12 who host the requisite data application 110 that is responsible for processing the secondary data.

In another embodiment, the group communication server 32 can maintain a second "floor" used solely for secondary (non-voice) data packet transmission. In such manner, data applications 100 can send custom data at any time during a PTT call regardless of the state of the "voice floor." The data application 110 requests the voice floor for transmitting talk spurts and the data floor for transmitting data packets, or both. If enough bandwidth is available, the group communication server 32 (and supporting devices) can grant multiple data and voice floors. If the wireless environment in which the group members are running have access to adequate resources, for example 38400 kbps, the group members would have enough bandwidth to support several RTP streams, both incoming and outgoing. The group communication server 32 will then provide multiple floors, permitting more than one data application 110 to hold a floor for data transmission (or potentially also the voice floor) at any one time.

Figure 7:
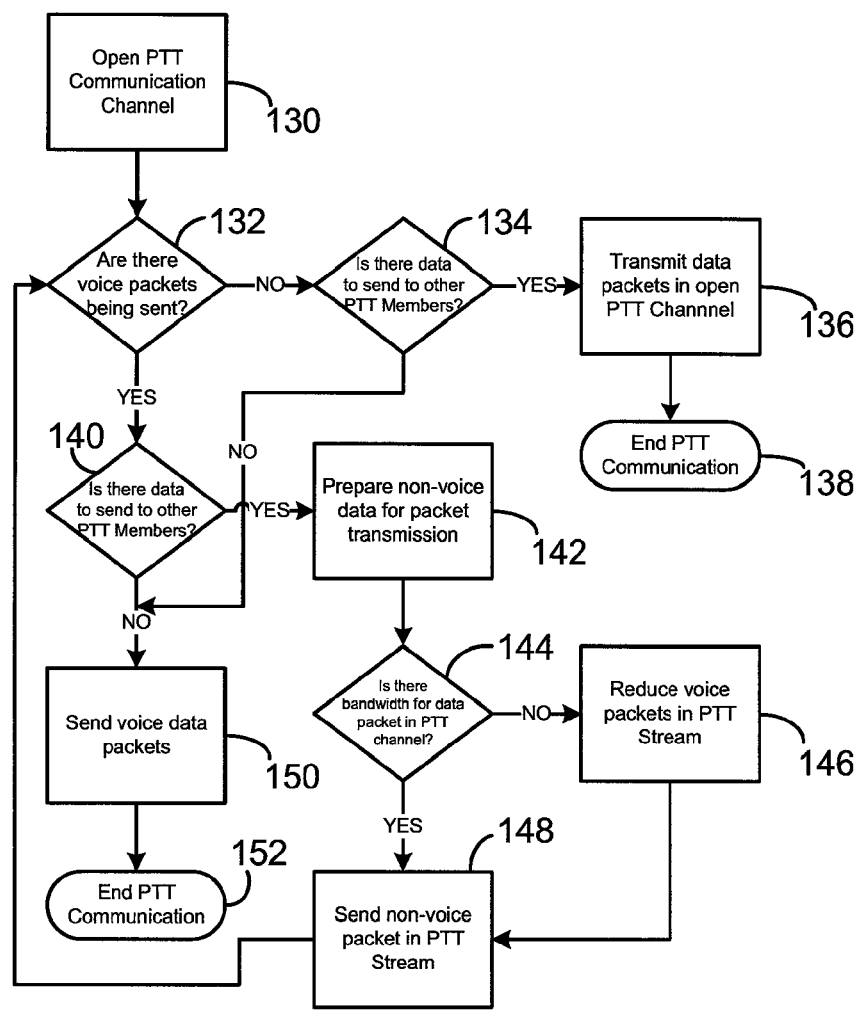
FIG. 7 is a flowchart of one embodiment of a wireless communication device transmitting voice data and non-voice data in a PTT communication.

FIG. 7 is a flowchart of one embodiment of a wireless communication device 14,16,18 transmitting voice data and non-voice data in a PTT communication. A request is made at the wireless communication device 14,16,18 to open a PTT communication channel, as shown at step 130, (as is done at the pressing of the PTT button) and then a determination is made as to whether voice data packets are being sent to members of the group, as shown at decision 132. If voice data packets are not being sent at decision 132, then a determination is then made as to whether there is non-voice, secondary data to be sent to other PTT members, as shown at decision 134 (as would happen in the embodiment of FIG. 6 with the data application 160 requesting the PTT activation). If there is secondary data to send at decision 134 then the secondary data packets are sent in the open channel, as shown by step 136, and the PTT communication is ended, as shown at termination 138. Otherwise, if there is not any secondary data present to send at decision 134, then the voice packets are sent, as shown at step 150, and the PTT communication is ended as shown at termination 152.

Otherwise, if there are voice packets being sent at decision 132, a determination is made as to whether there is also secondary data to be sent to one or more other group members, as shown at decision 140. If there is no secondary data being sent at decision 140, then the voice data is sent, as shown at step 150, and then the PTT communication is ended, as shown at termination 152. However, if there is secondary data for transmission at decision 140, then the non-voice, secondary data packets are prepared for transmission, as shown at step 142, and then a determination is made as to whether there is bandwidth for the data packets in the PTT communication channel, as shown at decision 144.

If there is adequate bandwidth at decision 144 for the non-voice data packets in the PTT stream, then the non-voice packets are send in the PTT stream and the process returns to decision 132 to again determine if there is more voice and non-voice data to be sent. Otherwise, if there is insufficient bandwidth for the non-voice data packet(s) in the PTT communication channel at decision 144, the voice packets size in the PTT data stream are reduced in size (as is shown in FIG. 5), as shown at step 146, and then the non-voice packet(s) are sent in the PTT stream as shown in step 148, and then process again iterates to decision 132 to determine if more voice and non-voice data is present for sending. In this embodiment, the sending of the voice and non-voice data packets is typically to the group communication server 32, but can alternately be directly to a member wireless device on another communication path (e.g. PTP, Internet, or other wireless or wired pathway), or other another computer device on the wireless network 20.

It can thus be seen that system 10 provides a method for transmitting secondary data in a group-communication data stream between wireless communication devices 14,16,18, that includes transmitting at least voice communication data from at least one wireless communication device 14,16,18 that is a member of a communication group 12 of wireless communication devices that communicate with each other in direct group communications across a wireless communication network 20, with at least one wireless communication device (such as telephone 14) configured to selectively transmit at least group-directed voice communication data to other members of the communication group 12 and secondary data to other computer devices (such as group member 16 and 18) across the wireless communication network 20. The transmission of the voice communication data and secondary data occurs in a communication channel having a limited bandwidth thereof, e.g. size A in FIG. 5. In one embodiment, the voice communication data 124 has a first data size thereof, and the first data size is selectively reduced to a second data size that is less than the bandwidth A of the communication channel, such that the secondary data 126 is transmitted within the communication channel along with the voice communication data of the second size, as shown in FIG. 5.

The transmission of the secondary data can be to other wireless communication devices 14,16,18 of the communication group 12, or can be transmission to a group communication server 32 such that the group communication server 32 receiving the secondary data and forwarding the secondary data to other wireless communication devices 14,16,18 of the communication group 12. The voice communication data can include voice data of a first quality, and the method includes reducing the first data size to the second data size which thereby causes the voice communication data to have voice data of a second quality. The method can include associating the secondary data with the voice communication data, or alternately that the data is not associated and can travel independently of each other. The method can also further include sending the secondary data such that the secondary data and voice communication data of a second size comprise a full bandwidth A of the communication channel, as shown in FIG. 5.

Further, the transmission to the communication group 12 can be limited to a primary wireless communication device of the member wireless communication devices that can transmit group-directed voice communications to the group at a specific time, such as a device that has the floor, and the transmitting of voice-communication data and secondary data occurs upon the wireless communication device 14,16, 18 being the primary wireless communication device. Otherwise, the transmitting of secondary data can occur independently of the wireless communication device 14,16,18 being the primary wireless communication device, such as with a secondary data "floor."

In view of the methods being executable on a mobile device and other computer platforms, the method can accordingly be performed by a program resident in a computer readable medium, where the program directs the mobile device or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. A method of transmitting secondary data in a group-communication data stream between wireless communication devices, comprising:

transmitting at least voice communication data from at least one wireless communication device that is a member of a communication group of wireless communication devices that communicate with each other in direct group communications across a wireless communication network, the at least one wireless communication device configured to selectively transmit at least group-directed voice communication data to other members of the communication group in a communication channel having a limited bandwidth thereof; and selectively sending secondary data comprising non-voice data from the at least one wireless communication device to other computer devices across the wireless communication network, the transmission occurring in combination with the voice communication data in the communication channel, wherein the voice communication data comprising a first data throughput size;

reducing the first data throughput size to a second data throughput size that is less than the bandwidth of the communication channel, causing the voice communication data to have voice data of a reduced quality; and transmitting the secondary data within the communication channel in combination with the voice communication data of the second data throughput size.

2. The method of claim 1, wherein transmitting the secondary data is transmitting group-directed media to other wireless communication devices of the communication group.

3. The method of claim 1, wherein transmitting the secondary data is transmitting secondary data to a group communication server.

4. The method of claim 1, wherein the group communication server receiving the secondary data and forwarding the secondary data to other wireless communication devices of the communication group.

5. The method of claim 1, further comprising associating the secondary data with the voice communication data by transmitting the secondary data together with the voice communication data in the communication channel.

6. The method of claim 1, further sending the secondary data such that the secondary data and voice communication data of a second size comprise a full bandwidth of the communication channel.

7. The method of claim 1, wherein transmission to the communication group is limited to a primary wireless communication device of the member wireless communication devices that can transmit group-directed voice communications to the group at a specific time, and the transmitting of voice-communication data and secondary data occurs upon the wireless communication device being the primary wireless communication device.

8. The method of claim 1, wherein transmission to the communication group is limited to a primary wireless communication device of the member wireless communication devices that can transmit group-directed voice communications to the group at a specific time, and the transmitting of secondary data occurs independently of the wireless communication device being the primary wireless communication device by requesting a second floor for secondary non-voice data packet transmission.

9. The method of claim 1, wherein the at least one wireless communication device sends and receives voice data across a plurality of communication channels, and further comprising selectively sending secondary data from the at least one wireless communication device to other computer devices across the wireless communication network wherein the transmission occurring in combination with the voice communication data in each communication channel by granting multiple requests for a voice floor or a data floor for a group-communication data stream.

10. The method of claim 1, further comprising:
receiving a minimum voice data packet requirement; and
reducing the first data throughput size to the second data throughput size that is greater than the minimum voice data packet requirement.

11. A system of transmitting secondary data in a group-communication data stream between wireless communication devices, comprising:
at least one wireless communication device that is a member of a communication group of wireless communication devices that communicate with each other in direct group communications across a wireless communication network, the at least one wireless communication device configured to:
selectively transmit at least group-directed voice communication data to other members of the communication group in a communication channel having a limited bandwidth thereof and secondary data comprising non-voice data to other computer devices across the wireless communication network, the transmission of the secondary data within the communication channel in combination with the voice communication data, wherein the voice communication data having a first data throughput size thereof;
reduce the first data throughput size to a second data throughput size that is less than the bandwidth of the communication channel, causing the voice communication data to have voice data of a reduced quality; and
transmit the secondary data within the communication channel in combination with the voice communication data of the second data throughput size; and
at least one group-communication server that is configured to receive voice communication data and secondary data from the at least one wireless communication device and selectively transmit at least the voice communication data to other member wireless communication devices of the communication group.

12. The system of claim 11, wherein the at least one wireless communication device further configured to transmit group-directed media as secondary data to other wireless communication devices of the communication group.

13. The system of claim 11, wherein the at least one group-communication server is further configured to selectively transmit secondary data to other member wireless communication devices of the communication group.

14. The system of claim 11, wherein the at least one group-communication server further comprising associating the secondary data with the voice communication data by transmitting the secondary data together with the voice communication data in the communication channel.

15. The system of claim 11, wherein the at least one wireless communication device further configured to transmit the secondary data such that the secondary data and voice communication data of a second size comprise a full bandwidth of the communication channel.

16. The system of claim 11, wherein the communication group is limited to a primary wireless communication device of the member wireless communication devices that can transmit group-directed voice communications to the group at a specific time, and the at least one wireless communication device further configured to transmit voice-communication data and secondary data upon the wireless communication device being the primary wireless communication device.

17. The system of claim 16, wherein at least one wireless communication device further configured to transmit secondary data independently of the wireless communication device being the primary wireless communication device by requesting a second floor for secondary non-voice data packet transmission.

18. The system of claim 11, wherein the at least one wireless communication device further configured to selectively transmit at least group-directed voice communication data to other members of the communication group in a plurality of communication channels each having a limited bandwidth thereof, and the at least one wireless communication device further configured to transmit secondary data within each communication channel in combination with the voice communication data by granting multiple requests for a voice floor or a data floor for a group-communication data stream.

19. The system of claim 11, wherein the at least one wireless communication device is further configured to receive a minimum voice data packet requirement, and to reduce the first data throughput size to the second data throughput size that is greater than the minimum voice data packet requirement.

20. A non-transitory computer-readable product having stored thereon processor executable instructions configured to cause a processor to perform operations comprising:
transmitting at least voice communication data from at least one wireless communication device that is a member of a communication group of wireless communication devices that communicate with each other in direct group communications across a wireless communication network, the at least one wireless communication device configured to selectively transmit at least group-directed voice communication data to other members of the communication group in a communication channel having a limited bandwidth thereof;
selectively sending secondary data comprising non-voice data from the at least one wireless communication device to other computer devices across the wireless communication network, the transmission of the secondary data occurring in the communication channel in combination with the voice communication data, wherein the voice communication data comprises a first data throughput size;

reducing the first data throughput size to a second data throughput size that is less than the bandwidth of the communication channel, causing the voice communication data to have voice data of a reduced quality; and transmitting the secondary data within the communication channel in combination with the voice communication data of the second data throughput size.

21. The non-transitory computer-readable medium of claim 20, wherein the stored processor executable instructions are configured to cause the processor to perform operations further comprising:

receiving a minimum voice data packet requirement; and reducing the first data throughput size to the second data throughput size that is greater than the minimum voice data packet requirement.

22. A wireless communication device that is a member of a communication group of wireless communication devices that communicate with each other in direct group communications across a wireless communication network, the wireless communication device configured to:

selectively transmit at least group-directed voice communication data to other members of the communication group in a communication channel having a limited bandwidth thereof and secondary data comprising non-voice data to other computer devices across the wireless communication network, the transmission of the secondary data occurring in the communication channel in combination with the voice communication data, the voice communication data having a first data throughput size;

reduce the first data throughput size to a second data throughput size that is less than the bandwidth of the communication channel, causing the voice communication data to have voice data of a reduced quality; and transmit the secondary data within the communication channel in combination with the voice communication data of the second data throughput size.

23. The wireless communication device of claim 22, further configured to transmit group-directed media as secondary data to other wireless communication devices of the communication group.

24. The wireless communication device of claim 22, further configured to selectively transmit secondary data to a group-communication server of the communication group.

25. The wireless communication device of claim 22, further configured to associate the secondary data with the voice communication data by transmitting the secondary data together with the voice communication data in the communication channel.

26. The wireless communication device of claim 22, further configured to transmit the secondary data such that the secondary data and voice communication data of a second size comprise a full bandwidth of the communication channel.

27. The wireless communication device of claim 22, wherein the communication group is limited to a primary wireless communication device of the member wireless communication devices that can transmit group-directed voice communications to the group at a specific time, and the wireless communication device further configured to transmit voice-communication data and secondary data upon the wireless communication device being the primary wireless communication device by granting multiple requests for a voice floor or a data floor for a group-communication data stream.

28. The wireless communication device of claim 27, further configured to transmit secondary data independently of the wireless communication device being the primary wireless communication device by requesting a second floor for secondary non-voice data packet transmission.

29. The wireless communication device of claim 22, further configured to selectively transmit at least group-directed voice communication data to other members of the communication group in a plurality of communication channels each having a limited bandwidth thereof, and to transmit the secondary data in each communication channel in combination with the voice communication data.

30. The wireless communication device of claim 22, wherein the wireless communication device is further configured to receive a minimum voice data packet requirement, and to reduce the first data throughput size to the second data throughput size that is greater than the minimum voice data packet requirement.

31. A wireless communication device that is a member of a communication group of wireless communication devices that communicate with each other in direct group communications across a wireless communication network, the wireless communication device comprising:

means for selectively transmitting at least group-directed voice communication data to other members of the communication group in a communication channel having a limited bandwidth thereof;

means for selectively transmitting secondary data comprising non-voice data to other computer devices in the communication channel in combination with the voice communication data, the voice communication data having a first data throughput size thereof;

means for reducing the first data throughput size to a second data throughput size that is less than the bandwidth of the communication channel, causing the voice communication data to have voice data of a reduced quality; and means for transmitting the secondary data within the communication channel in combination with the voice communication data of the second data throughput size.

32. The wireless communication device of claim 31, further comprising:

means for receiving a minimum voice data packet requirement; and means for reducing the first data throughput size to the second data throughput size that is greater than the minimum voice data packet requirement.

* * * * *